United States Patent
Vitze et al.

(10) Patent No.: US 11,542,162 B2
(45) Date of Patent: Jan. 3, 2023

(54) HIGHLY REACTIVE, DUST-FREE AND FREE-FLOWING LITHIUM SULPHIDE AND METHOD FOR THE PRODUCTION THEREOF

(71) Applicants: ALBEMARLE GERMANY GMBH, Frankfurt am Main (DE); Hannes Vitze, Idstein (DE); Vera Nickel, Haiger (DE); Sebastian Lang, Goslar (DE); Marc-Christian Müller, Ober-Hilbersheim (DE); Sebastian Pietzner, Zeilsheim (DE); Armine Plath, Frankfurt am Main (DE)

(72) Inventors: Hannes Vitze, Idstein (DE); Vera Nickel, Haiger (DE); Sebastian Lang, Goslar (DE); Marc-Christian Müller, Ober-Hilbersheim (DE); Sebastian Pietzner, Zeilsheim (DE); Armine Plath, Frankfurt am Main (DE)

(73) Assignee: Albemarle Germany GmbH, Frankfurt am Main (DE)

( * ) Notice: Subject to any disclaimer, the term of this patent is extended or adjusted under 35 U.S.C. 154(b) by 69 days.

(21) Appl. No.: 16/481,244

(22) PCT Filed: Feb. 2, 2018

(86) PCT No.: PCT/EP2018/052688
§ 371 (c)(1),
(2) Date: Jul. 26, 2019

(87) PCT Pub. No.: WO2018/141919
PCT Pub. Date: Aug. 9, 2018

(65) Prior Publication Data
US 2020/0165129 A1     May 28, 2020

(30) Foreign Application Priority Data

Feb. 3, 2017  (DE) .................. 10 2017 201 772.4

(51) Int. Cl.
| C01B 17/30 | (2006.01) |
| C01B 17/38 | (2006.01) |
| C01D 15/02 | (2006.01) |
| H01M 4/58 | (2010.01) |
| H01M 10/0525 | (2010.01) |
| H01M 10/0562 | (2010.01) |
| H01M 4/02 | (2006.01) |

(52) U.S. Cl.
CPC .............. *C01B 17/38* (2013.01); *C01D 15/02* (2013.01); *H01M 4/5815* (2013.01); *H01M 10/0525* (2013.01); *H01M 10/0562* (2013.01); *C01P 2004/61* (2013.01); *C01P 2006/12* (2013.01); *C01P 2006/40* (2013.01); *C01P 2006/80* (2013.01); *H01M 2004/028* (2013.01); *H01M 2300/0068* (2013.01)

(58) Field of Classification Search
CPC ..... C01B 17/22; C01B 17/38; C01P 2006/80; C01P 2006/20
USPC .................... 423/179.5, 183, 566.2
See application file for complete search history.

(56) References Cited

U.S. PATENT DOCUMENTS

| 5,958,281 | A | * | 9/1999 | Takada | ..................... C01B 17/22 429/305 |
| 8,075,865 | B2 | | 12/2011 | Deiseroth et al. | |
| 2011/0206600 | A1 | * | 8/2011 | Barker | ................. C01G 49/009 423/566.2 |
| 2014/0227610 | A1 | * | 8/2014 | Aburatani | ............... C03C 10/00 429/322 |
| 2015/0221978 | A1 | * | 8/2015 | Murota | ................. H01M 4/505 429/320 |

FOREIGN PATENT DOCUMENTS

| CN | 105016310 A | * | 11/2015 | |
| EP | 0 802 159 A1 | * | 10/1997 | |
| EP | 0802575 A2 | | 10/1997 | |
| EP | 2759525 A1 | | 7/2014 | |
| JP | 2006151725 A | * | 6/2006 | ............ Y02E 60/10 |
| WO | 2009047254 A1 | | 4/2009 | |

OTHER PUBLICATIONS

Chen et al.; "High Capacity All-Solid-State Cu-Li2S/Li6PS5Br/In Batteries", Solid State Ionics, 2014, 262, pp. 183-187.
Hassoun et al., "A High-Performance Polymer Tin Sulfur Lithium Ion Battery"; Angew. Chem.. Int. Ed., 2010, 49, pp. 2371-2374, and Supporting Information (3 pages).
Lee et al., "Nanostructured Lithium Sulfide Materials for Lithium-Sulfur Batteries", J. Power Sources, 2016, 323, pp. 174-188.

* cited by examiner

*Primary Examiner* — Hoa (Holly) Le
(74) *Attorney, Agent, or Firm* — Troy S. Kleckley

(57) ABSTRACT

The invention relates to a highly reactive, high-purity, free-flowing and dust-free lithium sulfide powder having an average particle size between 250 and 1,500 μm and BET surface areas between 1 and 100 m²/g. The invention, furthermore, relates to a process for its preparation, wherein in a first step, lithium hydroxide monohydrate is heated in a temperature-controlled unit to a reaction temperature between 150° C. and 450° C. in the absence of air, and an inert gas is passed over or through it, until the residual water of crystallization content of the formed lithium hydroxide is less than 5 wt. % and in a second step, the anhydrous lithium hydroxide formed in the first step is mixed, overflowed or traversed by a gaseous sulfur source from the group consisting of hydrogen sulfide, elemental sulfur, carbon disulfide, mercaptans or sulfur nitrides.

13 Claims, No Drawings

HIGHLY REACTIVE, DUST-FREE AND FREE-FLOWING LITHIUM SULPHIDE AND METHOD FOR THE PRODUCTION THEREOF

REFERENCE TO RELATED APPLICATIONS

This application is the National Stage of International Patent Application No. PCT/EP2018/052688, filed on Feb. 2, 2018, which application claims priority from German Patent Application No. 10 2017 201 772.4, filed Feb. 3, 2017, the disclosures of which are incorporated herein by reference.

The invention relates to a highly reactive, highly pure, free-flowing and dust-free lithium sulfide powder and its preparation.

Lithium sulfide is currently used as a raw material for sulfidic solid electrolytes. Such solid electrolytes will replace liquid electrolytes in lithium-based battery systems in the future. The intention is to improve the safety of battery systems. Currently applied liquid or polymeric electrolytes use $LiPF_6$ as a conducting salt, which decomposes above 70° C., thereby causing secondary reactions with other cell constituents. These mostly exothermic reactions can lead to spontaneous heating and eventually complete destruction of the electrochemical cell while the applied organic solvents are ignited.

Lithium sulfide may also be used as an active material in lithium-sulfur cells. For this purpose, a discharged structure is used, whereby a lithium-free material such as conventional graphite is used as the anode and lithium sulfide as the cathode. (B. Scrosati, Angew. Chem. 2010, 122, 2421-4).

In order to achieve an optimal space-time yield in the preparation processes of the sulfidic solid electrolytes described above, such as $Li_6PS_5X$ (X=Cl, Br, I), the reactivity of the individual raw materials needs to be increased (WO2009047254). This can be achieved by surface enlargement by grinding or expensive special processes for preparing lithium sulfide (YK Sun, J. Power Sources, 2016, 323, 174-188). However, ground lithium sulfide is not easily handled, since the powder is no longer flowable. The dosage of such a powder is complex and associated with an increased risk potential.

In addition to the desired increased reactivity, coupled with the simple handling of such a product, the lithium sulfide should be highly pure, i.e., preferably contain no foreign elements or other impurities. Particular attention should be paid here to polysulfidic and sulfoxide impurities, as these lead to reduced cycle stability of the galvanic cells. For the same reason, redox-active species, such as transition metal cations, should likewise be avoided.

The object of the invention was to provide a free-flowing, yet highly reactive lithium sulfide, and a process for its simple and inexpensive preparation.

This object is achieved by a porous lithium sulfide, which is free-flowing and dust-free, due to its particle size and its narrow distribution function, having an average particle size between 250 and 1500 µm and BET surface areas between 1 and 100 $m^2/g$. It is further characterized in that, with conversion to sulfidic solid electrolytes, the conversion is at least 90 wt. % and contains cationic impurities from the group of alkali, alkaline earth and transition metal cations in the 0.01-100 ppm range and anionic impurities from the group of carbon and sulfur oxoanions, as well as halide concentrations of 1-1,000 ppm.

The average particle size is measured according to this invention as a volume-distribution function determined by laser diffraction particle analysis of suspensions of the corresponding solid in an inert medium.

Advantageously, the lithium sulfide according to the invention is one in which transition metal cations of iron, nickel and/or chromium are present in a concentration range of 0.01-10 ppm, and carbonate, sulfate, sulfite, thiosulfate, chloride, bromide and/or iodide anions are present in a 1-1,000 ppm concentration range.

The lithium sulfide according to the invention is further characterized in that it is free-flowing, whereby when charging a metal hopper having a body diameter of 45 mm, a neck diameter of 5 mm, a neck length of 3 mm and an opening angle of 55° with 3.5 grams of the lithium sulfide powder, the lithium sulfide powder emerges from the metal hopper leaving a residual amount of at most 0.0005 g, after opening the outlet.

The process according to the invention consists in a first stage of heating lithium hydroxide monohydrate with an average particle size in the 150-2,000 µm range in a temperature-controlled unit to a reaction temperature between 150° C. and 450° C. in the absence of air, and flowing an inert gas over or through it, until the residual water of crystallization content of the formed lithium hydroxide is less than 5 wt. % and in a second stage, the anhydrous lithium hydroxide formed in the first stage is mixed, overflowed or traversed by a sulfur source from the group consisting of hydrogen sulfide, elemental sulfur, carbon disulfide, mercaptans or sulfur nitrides. In the absence of air, a residual content of oxygen, $CO_2$, CO and/or COS of less than 300 ppm in the carrier gas stream is observed.

This process results a product, in which the morphological properties are set via the preparation of the lithium hydroxide intermediate and retained during further conversion to lithium sulfide. Furthermore, by implementing this process, a very high purity of the obtained lithium sulfide is ensured.

The product according to the invention is preferably produced in a two-stage, one-pot process. In a first process step, the water of crystallization is expelled producing a highly reactive, but nevertheless free-flowing lithium hydroxide powder, which is reacted in a second process step with a sulfur source to form a highly reactive and free-flowing lithium sulfide.

The term "high purity" is defined here, as follows: Cationic contaminants from the group of alkali, alkaline earth and transition metal cations are in the 0.01-100 ppm range. In particular, the transition metal cations iron, nickel and chromium are present here in a 0.01-10 ppm concentration range. Anionic impurities from the group of oxoanions of carbon (carbonate) and sulfur (sulfate, sulfite, thiosulfate), as well as halides (chloride, bromide, iodide) have concentrations of 1-1,000 ppm.

The high purity of the product according to the invention is realized by using particularly pure raw materials, the preservation of the inert gas chain from initial to complete filling, and the selection of materials.

Step 1—Production of a Highly Reactive, Free-Flowing LiOH Powder

First, lithium hydroxide monohydrate in powder form is presented as a raw material in a heatable unit. The average particle size of the applied lithium hydroxide monohydrate is preferably in a 150-2,000 µm range. The temperature-controlled unit for the preparation of the product according to the invention is preferably a fluidized bed dryer, a rotary kiln, a stirred or non-stirred reactor, or a static chamber furnace, and particularly preferred, a fluidized bed reactor, as process control in the fluidized bed reactor has a particularly slight influence on the particle morphology and may be operated under very gentle conditions with high conversion rates. Furthermore, such a reactor concept is very easily scalable.

The choice of reactor materials directly affects the purity of the obtained product, which is why preference is given to conventional reactor materials, such as alumina, zirconia, quartz glass, stainless steel or other metallic materials, which are not subject to cations being leached by raw materials or products under the reaction conditions described here.

The purity of the applied lithium hydroxide monohydrate should preferably equal battery quality, i.e., typical anionic impurities, such as carbonate or sulfate should be less than 1,000 ppm and cationic impurities, such as iron, chromium and nickel, less than 20 ppm. Moreover, the flow properties of the raw material should allow for the use of free-flowing and lump-free lithium hydroxide monohydrate.

For the purposes of the present invention, free-flowing means that when approx. 3.5 grams of a solid is loaded into a metal hopper with a body diameter of 45 mm, a neck diameter of 5 mm, a neck length of 3 mm, and an opening angle of 55°, the material emerges residue-free from the vessel (max. 0.0005 grams of residual amount), after opening the outlet (see Examples 1-18).

The first process step according to the invention consists of drying the charged lithium hydroxide monohydrate under precisely defined conditions for the anhydrous lithium hydroxide according to equation 1 in order to set a desired particle morphology and size distribution of the anhydrous lithium hydroxide in a precise manner.

$$LiOH \cdot H_2O \rightarrow LiOH + H_2O \quad (1)$$

Thus, the lithium hydroxide monohydrate powder is heated in the absence of air, whereby an inert carrier gas with a flow rate of 1 to 10,000 l/h flows over or through the unit. Nitrogen or argon is preferably used as the inert carrier gas. The flow rate of the inert carrier gas is preferably in the range of 10-1,000 l/h, preferably 100-1,000 l/h. The flow rate is set such that fines of the raw material with particles less than 50 μm may be discharged with the gas stream and collected by a suitable unit. The thus-prepared lithium hydroxide is dust-free for the purposes of the invention.

For the purposes of the present invention, dust-free means that 90% of all particles of a material have an average particle size in the 250-2,000 μm range, measured as a volume distribution function determined by laser diffraction particle analysis of suspensions of the corresponding solid in an inert medium.

The reaction temperature is in the 20° C.-450° C. range, whereby preferably temperatures between 200° C. and 400° C. are employed. The heating rate at which the final unit temperature is reached is between 1° C. per min. and 100° C. per min.

The first process step described above is considered complete, when the residual water of crystallization content in the lithium hydroxide falls below 5 wt. %.

The applied temperature and the set heating rate directly influence particle morphology and thus the properties of the lithium hydroxide, as will be shown below.

If the water of crystallization is expelled from lithium hydroxide monohydrate at low temperatures, complete drying will not take place at temperatures below 100° C., the back reaction of the released water is in equilibrium with the drying reaction; complete drying requires very high inert gas flow rates and/or long drying times here. Generally, at temperatures above 100° C., the equilibrium of the two-way drying reaction is shifted to the side of the anhydrous lithium hydroxide, making the space-time yield of this process step more positive.

Surprisingly, however, the morphology of the produced anhydrous lithium hydroxide (residual water content of less than 5 wt. %) differs significantly depending on the selected drying conditions. If drying takes place at low temperatures between 100° C. and 200° C., the resulting lithium hydroxide is generally less reactive toward the sulfur source used for sulfidizing in the following process step (Examples 1 and 5) than is the lithium hydroxide dried at comparatively high temperatures between 200° C. and 400° C. This property correlates with the BET surface area of the porous lithium hydroxide particles, which is smaller for low drying temperatures than for temperatures above 200° C. (Examples 1, 2, 5 and 6). This thesis is, furthermore, supported by scanning electron micrographs revealing a finer and more uniformly distributed pore structure for higher reaction temperatures. An analogous, although less pronounced effect can be observed with different heating rates. Markedly more craters and cracks appear on the particle surface on the scanning electron micrographs of the slowly heated samples, whereas the rapidly heated lithium hydroxide particles show markedly less rough surface structures (Examples 1-4 and 5-8).

The particle size also shows the effect of the changed particle morphology. The lithium hydroxide powders, which were dried at temperatures between 100° C. and 200° C. reveal smaller average particle sizes than do those dried at temperatures between 200° C. and 400° C. (see Examples 1 and 5 vs. Examples 2-4 and 6-8).

This tendency is also observable for different heating rates. In general, it can be determined that higher BET surface areas, larger average particle sizes and increased reactivities can be realized with an increasing temperature, as well as with an increasing heating rate (Examples 1 and 5, and also 2-4 and 6-8). Flowability of the inventive lithium hydroxide powders depends on the particle size distribution, which is why higher drying temperatures are also advantageous for realizing good flow properties (Examples 1 and 5, and 2-4 and 6-8). Absence of dust is achieved by gas flows ranging between 20 l/h and 2000 l/h.

A surprising and interesting observation concerns the lithium hydroxide powders, which were dewatered at 450° C. The reactivities toward lithium sulfide no longer increase significantly compared with the tendency of the other samples, but rather stagnate. Accordingly, drying processes near the melting point of lithium hydroxide (Tm=450° C.) no longer have a more obvious positive effect on the pore structure and thus reactivity (Examples 3, 4, 7 and 8). The average particle size also follows this tendency. In contrast, the BET surface area is only half as large; this is surprising in that besides the surface, apparently another important parameter for determining reactivity is present. The reason for the decrease in the BET surface area and therefore also the porosity lies with the drying temperature, which causes the material to soften and thus the pores to close.

In order to investigate reactivity of the individual lithium hydroxides, sulfidation was discontinued following stoichiometric $H_2S$ dosing. However, the samples were subsequently fully converted to lithium sulfide by an excess of $H_2S$ to ensure reproducibility and relevance.

Step 2—Production of a Highly Reactive, Free-Flowing $Li_2S$ Powder

The second step in the preparation of the product according to the invention involves treating the free-flowing, dust-free and highly reactive lithium hydroxide powder produced in step 1 with a sulfur source, such as hydrogen sulfide, gaseous elemental sulfur, carbon disulfide, mercaptans, or sulfur nitrides. Gaseous $H_2S$ of the maximum purity is preferred (see equation 2). The applied $H_2S$ should only contain amounts <300 ppm of gaseous impurities that may react with lithium hydroxide or lithium sulfide, such as $CO_2$, CO or COS.

$$2LiOH + H_2S \rightarrow Li_2S + 2H°_RO \qquad (2)$$

Since this reaction involves a slightly exothermic acid-base reaction ($\Delta H°_R = -17$ kJ/mol), it is possible to work under the very mild conditions as described below, resulting in the retention of the morphology set in step 1 and the corresponding properties, as explained below.

In general, the preferred conditions of the second process step should be selected such that the particle morphology generated in the step is retained, since this determines the desired inventive properties. These are particle size and particle size distribution for the positive flow properties, as well as BET surface area and pore structure for the increased reactivity (see Examples 1-8 (LiOH) vs. Examples 9-16 ($Li_2S$)).

For the preparation of highly reactive, dust-free and free-flowing lithium sulfide, a constant hydrogen sulfide stream consisting of either pure $H_2S$ or a mixture of $H_2S$ and an inert carrier gas is introduced into the reactor filled with anhydrous lithium hydroxide, as described in step 1. The mixing ratio is between 0 vol. % inert gas in 100 vol. % $H_2S$ and 99 vol. % inert gas and 1 vol. % $H_2S$. The inert carrier gas is preferably nitrogen or argon.

The reactor temperature at initial introduction of the reactive gas is in the 20° C.-450° C. range, preferably working with temperatures between 200° C. and 400° C. The heating rate at which the final temperature of the unit is reached is between 1° C. per min. and 100° C. per min. Alternatively, a cooling and heating step between step 1 (drying of lithium hydroxide monohydrate) and step 2 (reaction to lithium sulfide) may be omitted. The previously described second process step is deemed complete, when the reaction water <4 g/m³ is more detectable in the exhaust gas flow of the unit. The water determination process is freely selectable, but will have be sufficiently accurate.

To study reactivity of the produced lithium sulfide powders, a process for producing the sulfidic solid electrolyte of the composition $Li_6PS_5Br$ was found in the literature [Solid State Ionics, 2014, 262, 183-187]. It relates to reactive milling in a high-energy planetary ball mill with subsequent temperature treatment in order to increase crystallinity.

The reactivity of the lithium sulfide samples prepared in step 2 toward sulfidic solid electrolytes known from the literature is directly related to the microstructure of the particles realized in step 1, which is retained in the process step performed in step 2. Accordingly, the reactivity of a lithium sulfide powder is increased as the BET surface area and pore structure are increased. As already explained in step 1, this applies to high temperatures and, although less pronounced, to high heating rates (Examples 9, 10, 15, 16). The conversion to solid electrolyte of the inventive lithium sulfide powders is at least 90 wt. %, whereas commercially available lithium sulfide powders only show conversions between 30 and 50 wt. % (Examples 17 and 18).

The reduced particle size of commercial samples surprisingly does not result in a higher surface area or increased reactivity in a comparison with all the lithium sulfide samples according to the invention. Surprisingly, even the samples with the lowest reactivities (Examples 10 and 15) are clearly more reactive in the conversion to sulfidic solid electrolytes than are the chemically more or less identical commercial comparative samples.

The flow properties and the absence of dust are also adjustable via a template effect in step 1. Particle size distribution and morphology are retained via process step 2 of the invention. This produces a free-flowing, yet highly reactive lithium sulfide powder. Commercially available lithium sulfide powders are clearly handled and dosed with much greater difficulty given their small particle size. This is very obvious from the flowability examples, in that commercially available, very fine lithium sulfide powders do not show any flowability or pourability in the discharge experiments described above (Examples 17 and 18).

The inventive template effect, which is transferred from the dewatered lithium hydroxide powder to the lithium sulfide powder, is also visible in the samples dried near the melting point of LiOH.

The comparable reactivity of lithium hydroxide toward lithium sulfide already demonstrated for LiOH also applies to the lithium sulfide and its reactivity to $Li_6PS_5Br$ (Examples 12 and 16) in a similar fashion. The surprising decrease of the BET surface area with constant reactivity is also observed here (Examples 12 and 16).

In order to produce an inventive lithium sulfide with cationic impurities from the group of alkali, alkaline earth and transition metal cations in the 0.01-100 ppm range, metallic materials in reactor parts, which are in contact with the raw material, the intermediate and [final] product are omitted in the present process and only raw materials with the above-mentioned cationic impurity profiles are selected. Due to their electrochemical activity, cationic impurities have a detrimental effect on the performance of a lithium sulfide secondary product, such as sulfide solid electrolytes or cathode materials.

Anionic impurities negatively affect reactivity of the lithium sulfide and should therefore be avoided by the inventive measures. In addition to the selection of a LiOH·$H_2O$ with impurities in the specified range, the process conditions explained below are also selected, thus preventing the emergence of undesired anionic by-products.

In order to prove the negative influence on the reactivity of lithium sulfide experimentally, lithium hydroxide monohydrate powder was selectively contaminated with different lithium carbonate components in Examples 19 to 21. Here, lithium carbonate is representative of all anionic impurities so as to emphasize the effect of influencing reactivity. The thus-contaminated raw material was initially dewatered similarly as in step 1 and subsequently converted to lithium sulfide similarly as in step 2. Here, too, in order to investigate the reactivity of the individual lithium hydroxides, sulfidation was discontinued after stoichiometric $H_2S$ dosing. The samples were then fully converted to lithium sulfide by an excess of $H_2S$ to ensure reproducibility and relevance.

With increasing carbonate content (1%, 5% and 10 wt. %) in LiOH, conversion to $Li_2S$ decreases significantly. This likewise applies similarly to the lithium sulfides contaminated with $Li_2CO_3$ obtained therefrom, whose conversion to $Li_6PS_5Br$ decreases proportionally to the carbonate content. (Examples 19-21).

In order to minimize the amount of carbonate and sulfoxide impurities, an intact protective gas chain throughout the whole process must be especially heeded. Lithium hydroxide monohydrate and its dehydrated analog react extremely rapidly with $CO_2$ in the air and form lithium carbonate, which reacts only slowly in a reaction with $H_2S$ at the temperatures according to the invention and thus remains as an impurity in the product.

This negatively impacts the conversion to solid electrolytes, such as $Li_6PS_5Br$ (see Examples 19-21). Sulfoxide impurities, such as sulfate, sulfite, thiosulfate, or similar anions of oxygen and sulfur, are formed, when oxygen enters the reaction chamber during sulfuration of LiOH, or from the reaction of $Li_2S$ with oxygen at elevated temperatures.

The invention will be explained in more detail with reference to the examples shown in the tables below.

EXAMPLES

Step 1—Preparation of a Highly Reactive, Free-Flowing LiOH Powder for Use in Step 2

| | Drying conditions* | | | | Product characteristics | | | | | |
|---|---|---|---|---|---|---|---|---|---|---|
| Example | Inert gas volume flow rate [l/h] | Heating rate [° C./min] | Temperature [° C.] | Time [min] | Fluidity** | $d_{50}$ [μm] | Absence of dust*** | BET surface area [m$^2$/g] | Pore structure**** | Conversion to Li$_2$S***** [%] |
| LiOH•H$_2$O raw material | — | — | — | — | medium | 450 | No | 0.7 | None | 0 |
| 1 | 400 | 4 | 150 | 180 | medium | 246 | Yes | 1.5 | coarse; irregular | 50 |
| 2 | 400 | 4 | 250 | 180 | high | 310 | Yes | 9.2 | coarse & fine; regular | 60 |
| 3 | 400 | 4 | 350 | 180 | high | 359 | Yes | 7.3 | coarse & fine; regular | 90 |
| 4 | 400 | 4 | 450 | 180 | high | 359 | Yes | 4.8 | coarse; irregular | 92 |
| 5 | 400 | 60 | 150 | 180 | medium | 265 | Yes | 5.1 | coarse & fine, irregular | 50 |
| 6 | 400 | 60 | 250 | 180 | high | 319 | Yes | 7.1 | coarse & fine; regular | 70 |
| 7 | 400 | 60 | 350 | 180 | high | 327 | Yes | 7.6 | coarse & fine; regular | 90 |
| 8 | 400 | 60 | 450 | 180 | high | 321 | Yes | 3.8 | coarse & fine; regular | 90 |

*Drying in 4 cm diam. quartz glass reactor and 0.1 kg LiOH•H$_2$O initial weight
**Solid residue in hopper <0.0005 g
***no particles <150 μm
****derived from scanning electron micrographs
*****Conversion determined by X-ray powder diffraction of the samples after stoichiometric H$_2$S dosage Step 2—Preparation of a highly reactive, free-flowing Li$_2$S powder from the products of step 1

| | Reaction conditions* | | | | | | Product characteristics | | | | |
|---|---|---|---|---|---|---|---|---|---|---|---|
| Example | Volume flow rate of inert gas N2 [l/h] | Volume flow rate of reactive gas H2S [l/h] | Heating rate [° C./min] | Temperature [° C.] | Time [min] | Fluidity** | D50 [μm] | Absence of dust*** | BET surface area [m2/g] | Pore structure**** | Conversion to Li$_6$PS$_5$Br***** |
| 09 | 300 | 100 | 4 | 150 | 60 | high | 267 | Yes | 4.4 | coarse; irregular | 0 |
| 10 | 300 | 100 | 4 | 250 | 60 | high | 375 | Yes | 8.6 | coarse & fine; regular | 93 |
| 11 | 300 | 100 | 4 | 350 | 60 | high | 341 | Yes | 14.3 | coarse & fine; regular | ND |
| 12 | 300 | 100 | 4 | 450 | 60 | high | 438 | Yes | 7.4 | coarse; irregular | ND |
| 13 | 300 | 100 | 60 | 150 | 60 | high | 367 | Yes | 5.4 | coarse & fine, irregular | ND |
| 14 | 300 | 100 | 60 | 250 | 60 | high | 392 | Yes | 15.01 | coarse & fine; regular | ND |
| 15 | 300 | 100 | 60 | 350 | 60 | high | 311 | Yes | 14.6 | coarse & fine; regular | 94 |
| 16 | 300 | 100 | 60 | 450 | 60 | high | 361 | Yes | 6.6 | coarse & fine; regular | 100 |
| 17 | Commercial Li$_2$S | | | | | None | 15 | No | 3.6 | None | 48 |
| 18 | Commercial Li$_2$S | | | | | None | <75 | No | 3.7 | None | 37 |

*Reaction in 4 cm diam. quartz glass reactor and 0.1 kg LiOH•H$_2$O initial weight
**Solid residue in hopper <0.0005 g
***no particles <150 μm
****derived from scanning electron micrographs
*****determined by X-ray powder diffraction of the samples according to the synthesis route known from the literature Influence of Impurities on Reactivity

| | Reaction conditions for drying* | | | | | |
|---|---|---|---|---|---|---|
| Example | $w_i$ (Li$_2$CO$_3$) [Wt %] | Heating rate [° C./min] | Temperature [° C.] | Time [min] | Volume flow rate of Inert gas [l/h] | Reactivity Conversion of LiOH to Li$_2$S** [%] |
| 19 | 1 | 60 | 350 | 180 | 400 | 51 |
| 20 | 5 | 60 | 350 | 180 | 400 | 50 |
| 21 | 10 | 60 | 350 | 180 | 400 | 44 |

| | Reaction conditions for sulfidation* | | | | | |
|---|---|---|---|---|---|---|
| Example | Volume flow rate of Inert gas N2 [l/h] | Volume flow rate of reactive gas Reaktivgas H2S [l/h] | Heating rate [° C./min] | Temperature [° C.] | Time [min] | Reactivity Conversion of Li$_2$S to Li$_6$PS$_5$Br*** [%] |
| 19 | 300 | 100 | 60 | 350 | 60 | 97 |
| 20 | 300 | 100 | 60 | 350 | 60 | 82 |
| 21 | 300 | 100 | 60 | 350 | 60 | 80 |

*Reaction in 4 cm diam. quartz glass reactor, 0.1 kg LiOH•H$_2$O initial weight, drying conditions as in Example 7, reaction conditions as in Example 15
**Conversion determined by X-ray powder diffraction of the samples after stoichiometric H$_2$S dosage
***Conversion determined by X-ray powder diffraction of the samples according to the synthesis route known from the literature

The invention claimed is:

1. A lithium sulfide powder, characterized in that it has an average particle size between 250 and 1,500 μm and BET surface areas between 1 and 100 m$^2$/g, and contains cationic impurities from the group consisting of alkali metal, alkaline earth metal and transition metal cations in the 0.01-100 ppm range, and anionic impurities from the group consisting of oxoanions of carbon and sulfur, as well as halides in concentrations of 1-1,000 ppm.

2. A process for preparing a lithium sulfide powder according to claim 1, characterized in that in a first step, lithium hydroxide monohydrate having an average particle size in the range of 150-2,000 μm is heated in a temperature-controlled unit to a reaction temperature between 150° C. and 450° C. in the absence of air, and an inert gas is flowed over or through it, until the residual water of crystallization content of the formed lithium hydroxide is less than 5% by weight, wherein the heating rate to reach the reaction temperature is between 1° C. per min. and 1000° C. per min, and wherein the inert gas has a flow rate in the range of 100-1,000 l/h, and in a second step, the anhydrous lithium hydroxide formed in the first step is mixed, overflowed or traversed by a sulfur source from the group consisting of hydrogen sulfide, elemental sulfur, carbon disulfide, mercaptans or sulfur nitrides, wherein when the sulfur source is hydrogen sulfide, the hydrogen sulfide is introduced as a mixture of H$_2$S and an inert carrier gas.

3. The lithium sulfide powder according to claim 1, characterized in that transition metal cations of iron, nickel and/or chromium are present in a concentration range of 0.01-10 ppm, and carbonate, sulfate, sulfite, thiosulfate, chloride, bromide and/or iodide anions are present in a concentration range of 1-1,000 ppm.

4. The lithium sulfide powder according to claim 1, characterized in that it is free-flowing, whereby when charging a metal hopper with a body diameter of 45 mm, a neck diameter of 5 mm, a neck length of 3 mm and an opening angle of 55° with 3.5 grams of said lithium sulfide powder, said lithium sulfide powder emerges from the metal hopper leaving a residual amount of not more than 0.0005 grams, after opening the outlet.

5. The process according to claim 2, characterized in that the lithium sulfide powder is converted to sulfidic solid electrolytes, wherein at least 90% by weight of the lithium sulfide powder is converted to sulfidic solid electrolytes.

6. The process according to claim 2, characterized in that the reaction temperature in step 1 is between 200° C. and 400° C.

7. The process according to claim 6, characterized in that the reaction temperature in step 1 is between 300° C. and 400° C.

8. The process according to claim 2, characterized in that in step 2, a constant hydrogen sulfide stream consisting of a mixture of H$_2$S and an inert carrier gas is introduced into the reactor filled with the lithium hydroxide formed in step 1, wherein the mixing ratio is between 0 vol. % of inert gas in 100 vol. % of H$_2$S and 99 vol. % of inert gas and 1 vol. % of H$_2$S.

9. The process according to claim 8, characterized in that argon or nitrogen is used as a carrier gas.

10. Lithium hydroxide obtained according to the process of claim 2, characterized in that the particles formed in step 1 have an average particle size between 250 and 1,500 μm and BET surfaces areas between 1 and 100 m$^2$/g.

11. The process according to claim 2, characterized in that a heating rate of 1-100° C./min is applied in order to reach the reaction temperature.

12. The process according to claim 2, characterized in that the reaction temperature of step 2 is between 20° C. and 450° C.

13. The process according to claim 2, characterized in that the reaction temperature of step 2 is between 200° C. and 400° C.

* * * * *